(12) United States Patent
Whalen et al.

(10) Patent No.: US 9,696,187 B2
(45) Date of Patent: Jul. 4, 2017

(54) DEVICE FOR MEASURING TOTAL PRESSURE OF FLUID FLOW

(71) Applicant: Rosemount Aerospace Inc., Burnsvile, MN (US)

(72) Inventors: Mackenzie Whalen, Burnsville, MN (US); Brian Daniel Matheis, Lakeville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 27 days.

(21) Appl. No.: 14/789,598

(22) Filed: Jul. 1, 2015

(65) Prior Publication Data

US 2017/0003151 A1    Jan. 5, 2017

(51) Int. Cl.
*G01F 1/34* (2006.01)
*G01P 5/14* (2006.01)

(52) U.S. Cl.
CPC . *G01F 1/34* (2013.01); *G01P 5/14* (2013.01)

(58) Field of Classification Search
CPC ..... G01F 1/32; G01F 1/34; G01F 1/74; G01F 1/46; G01F 1/44
USPC .............. 73/861.22, 861.42, 861.04, 861.65, 73/861.63
See application file for complete search history.

(56) References Cited

U.S. PATENT DOCUMENTS

| | | | | |
|---|---|---|---|---|
| 4,481,828 A | * | 11/1984 | Cheng | G01F 1/36 73/861.63 |
| 4,599,906 A | * | 7/1986 | Freud | G01L 9/0073 73/706 |
| 4,651,572 A | | 3/1987 | Albertz et al. | |
| 4,836,019 A | * | 6/1989 | Hagen | G01P 13/025 73/180 |
| 5,365,795 A | * | 11/1994 | Brower, Jr. | G01F 1/363 73/861.63 |
| 5,442,958 A | * | 8/1995 | Hagen | G01P 13/02 73/170.02 |
| 5,591,922 A | * | 1/1997 | Segeral | G01F 1/36 73/861.04 |
| 6,352,001 B1 | * | 3/2002 | Wickert | G01F 25/0007 73/861.52 |

(Continued)

OTHER PUBLICATIONS

Santhosh K V, B K Roy; "An Intelligent Flow Measuring Technique Using Venturi," Proceedings of the International MultiConference of Engineers and Computer Scientists, 2012 vol. II, IMECS 2012, Mar. 14-16, 2012, Hong Kong; 6 pgs.

(Continued)

*Primary Examiner* — Jewel V Thompson
(74) *Attorney, Agent, or Firm* — Cantor Colburn LLP

(57) ABSTRACT

A device is disclosed for measuring total pressure of a fluid flow comprises a tubular member having an inlet chamber with an inlet opening at a first end of the tubular member. The tubular member also comprises an outlet chamber having an outlet opening at a second end of the tubular member. The inlet opening has a diameter transverse to the longitudinal axis and the outlet opening has a second diameter transverse to the longitudinal axis. The ratio of the first diameter to the second diameter is from 3:1 to 10:1. The tubular member also includes a transitional chamber between the inlet chamber and the outlet chamber. Total pressure can be measured in the inlet chamber.

20 Claims, 2 Drawing Sheets

(56) References Cited

U.S. PATENT DOCUMENTS

| | | | | |
|---|---|---|---|---|
| 6,463,810 B1* | 10/2002 | Liu | ............................ | G01F 1/44 |
| | | | | 73/861 |
| 6,546,812 B2* | 4/2003 | Lewis | ...................... | G01F 1/363 |
| | | | | 73/861.63 |
| 6,810,725 B2* | 11/2004 | Henderson | ................. | G01F 1/44 |
| | | | | 73/114.74 |
| 7,549,331 B1* | 6/2009 | Powell | .................... | G01P 5/165 |
| | | | | 73/170.02 |
| 8,521,450 B2* | 8/2013 | Oddie | ....................... | G01F 1/44 |
| | | | | 702/47 |
| 2005/0034535 A1* | 2/2005 | Sprague | ................ | G01F 1/3209 |
| | | | | 73/861.22 |
| 2008/0011099 A1* | 1/2008 | Jezernik | ................ | G01F 1/3209 |
| | | | | 73/861.42 |
| 2010/0071479 A1 | 3/2010 | Choisnet | | |
| 2014/0144248 A1* | 5/2014 | Walters | ................. | F16K 3/0209 |
| | | | | 73/861.61 |
| 2015/0134275 A1* | 5/2015 | Chen | ......................... | G01F 1/88 |
| | | | | 702/47 |

OTHER PUBLICATIONS

Search Report regarding related EP App. No. 16177517.6; dated Oct. 31, 2016; 10 pgs.

* cited by examiner

DEVICE FOR MEASURING TOTAL PRESSURE OF FLUID FLOW

BACKGROUND

This disclosure relates to the measurement of total pressure of a flowing fluid.

The total (i.e., stagnation) pressure of a flowing fluid can be used in combination with a measured static fluid pressure to determine a dynamic fluid pressure, which can be used to provide the flow velocity of the fluid. For contained flowing fluids flowing through a conduit or channel of known size, the flow velocity can be converted to a volumetric flow rate and, if the fluid density is known, a mass flow rate. For uncontained fluids, total pressure is often measured to determine the velocity of an object such as an aircraft or boat through a fluid such as air or water. Total pressure is known to be measured with any of a number of types of Pitot tubes. Pitot tubes typically have an open end in the direction from which the fluid is flowing and are closed on the opposite end. Dynamic pressure from the flowing fluid tends to direct fluid flow into the open end of the tube. At the opposite end, however, there is no outlet from which the fluid can escape so it stagnates. The pressure of stagnant fluid, i.e., stagnation pressure, in the tube is also known as total pressure. The static pressure of the fluid can be measured from a layer of fluid immediately adjacent to a surface that is oriented parallel with the fluid flow direction, such as through a port on an exterior surface of the pitot tube housing or on some other surface in contact with the flowing fluid remote from the pitot tube (e.g., an aircraft surface or a flow channel conduit wall).

One problem with Pitot tubes is that their closed end can make them susceptible to the accumulation of foreign solid or liquid particulates entrained in the flowing fluid. Such particulates can plug pressure sensing ports inside the Pitot tube, which can lead to false pressure readings. This is a particularly significant issue for aircraft speed sensors, not only because of the danger of flying without an accurate airspeed reading, but also because aircraft operating conditions such as airborne particulate such as due to clouds, both super-cooled liquid water and ice crystals, or sand/dust and volcanic ash and exposure to ground-based particulates can present unique challenges for the measurement of aircraft airspeed.

A commonly-used approach to the formation of ice particulates in airspeed sensor Pitot tubes is the use of heating elements in combination with the placement of one or more drain holes. These small drains are typically sized and positioned so as to not impact the total pressure at the measurement location inside the Pitot beyond the ability to account for with calibration. Ice barrier features are also used to either prevent ice formation or to promote its formation in non-sensitive areas. However, drain holes are still susceptible to plugging by solid or viscous liquid particulates, and barrier features only relocate the problem but do not eliminate it.

BRIEF DESCRIPTION

According to some aspects of this disclosure, a device for measuring total pressure of a fluid flow comprises a tubular member having a central longitudinal axis. The tubular member comprises an inlet chamber having an inlet opening at a first end of the tubular member. The inlet opening has a first diameter transverse to the longitudinal axis. The tubular member also comprises an outlet chamber having an outlet opening at a second end of the tubular member. The outlet opening has a second diameter transverse to the longitudinal axis. The ratio of the first diameter to the second diameter is from 3:1 to 10:1. The tubular member also comprises a transitional chamber between the inlet chamber and the outlet chamber. The transitional chamber has a third diameter transverse to the longitudinal axis at an end toward the inlet chamber, and a fourth diameter, smaller than the third diameter, transverse to the longitudinal axis at an end toward the outlet chamber. The device also comprises a total pressure sensor in communication with the inlet chamber. Optionally, in some aspects static pressure can be measured by a static pressure sensor in communication with the outlet chamber.

According to some aspects of this disclosure, a method of measuring total pressure of a fluid flow comprises measuring total pressure in an inlet chamber of a tubular member having a longitudinal axis. The tubular member comprises the inlet chamber having an inlet opening at a first end of the tubular member. The inlet opening has a first diameter transverse to the longitudinal axis. The tubular member also comprises an outlet chamber having an outlet opening at a second end of the tubular member. The outlet opening has a second diameter transverse to the longitudinal axis. The ratio of the first diameter to the second diameter is from 3:1 to 10:1. The tubular member also comprises a transitional chamber between the inlet chamber and the outlet chamber. The transitional chamber has a third diameter transverse to the longitudinal axis at an end toward the inlet chamber, and a fourth diameter, smaller than the third diameter, transverse to the longitudinal axis at an end toward the outlet chamber. Optionally, in some aspects static pressure can be measured by a measuring pressure in the outlet chamber.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
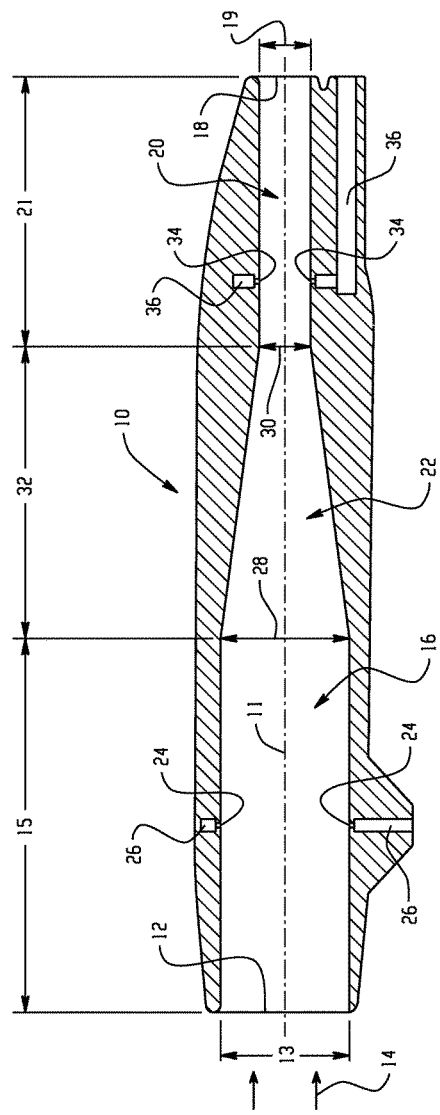
FIG. 1 is a schematic depiction of a tubular member as described herein.

Turning now to FIG. 1, a schematic depiction of a tubular member 10 having a longitudinal axis 11 is shown. The tubular member 10 has an inlet opening 12 (having a diameter 13) on the end facing into the direction of fluid flow 14. The inlet opening 12 opens to inlet chamber 16. The tubular member 10 also has an outlet opening 18 (having a diameter 19), connected to outlet chamber 20. A transitional chamber 22 is between the inlet chamber 16 and the outlet chamber 20. The inlet chamber 16 is fitted with total pressure sensing ports 24 that connect through total pressure sensing conduit 26 to a total pressure sensor (not shown). The forward positioning of the total pressure sensing ports is quite different from conventional Pitot tube design, which typically provides a stagnation point (and total pressure sensing port) toward the aft (closed) end of tube. The design described herein is able to provide such fluid dynamics with an open aft end instead of the typical close-ended Pitot tube configuration because of the fluid dynamic effects of the smaller diameter of outlet opening 18 compared to inlet opening 12, and of the diameter transition provided by the transitional chamber 22. The ratio of the inlet diameter 13 to the outlet diameter 19 can vary within a range. In some embodiments, the ratio of inlet diameter to outlet diameter ranges from 3:1 to 10:1. In some embodiments, the ratio of inlet diameter to outlet diameter ranges from 3:1 to 8:1. In some embodiments, the ratio of inlet diameter to outlet diameter ranges from 3:1 to 6:1. In some embodiments, the ratio of inlet diameter to outlet diameter ranges from 4:1 to 10:1. In some embodiments, the ratio of inlet diameter to outlet diameter ranges from 4:1 to 8:1. In some embodiments, the ratio of inlet diameter to outlet diameter ranges from 4:1 to 6:1. In some embodiments, the ratio of inlet diameter to outlet diameter ranges from 6:1 to 10:1. In some embodiments, the ratio of inlet diameter to outlet diameter ranges from 6:1 to 8:1. In some embodiments, the ratio of inlet diameter to outlet diameter ranges from 8:1 to 10:1. Diameters in absolute terms can vary widely depending on factors such as the fluid properties (e.g., density) and anticipated pressure and velocity, as well as on the surrounding environment. Examples of typical inlet diameters for aircraft and other airspeed sensors can range from 0.2 to 0.5 inches, from which examples of outlet diameters can be readily derived from the above ratio ranges.

With further reference to FIG. 1, it is seen that the diameter of the inlet chamber 16 appears to be constant and equal to the inlet diameter 13, and such an embodiment is within those contemplated by this disclosure. However, this embodiment is merely an example, and the diameter of the inlet chamber 16 can be fixed at a diameter different than the inlet diameter 13 or can be variable. In some exemplary embodiments, the inlet chamber can have a diameter that is fixed or varied. Additionally, chambers can have a cross-sectional profile transverse to the direction of airflow that is circular, or other shapes such as ovular, rectangular, square, etc., in which case the term "diameter", as used herein, shall refer to the hydraulic diameter, defined by the formula $D_H = 4A/P$ where DH is the hydraulic diameter, A is the cross-sectional area, and P is the perimeter of the cross-section.

The transitional chamber 22 can also contribute to the fluid dynamics that provide total fluid pressure in the inlet chamber as well as promoting an airflow pattern that can contribute to directing particulate material out of the tubular member through the outlet 18. In some embodiments, the transitional chamber 22, along with the inlet chamber 16 and the outlet chamber 20 are configured to provide an unobstructed fluid flow path between the inlet 12 and the outlet 18. By "unobstructed fluid flow path" it is meant that an imaginary straight line could be drawn without passing through an obstruction, from at least one location on a plane transverse to the longitudinal axis 11 at the outlet 18 to at least one location on a plane transverse to the longitudinal axis 11 at the inlet 13. In some embodiments, the transitional chamber 22, along with the inlet chamber 16 and the outlet chamber 20 are free of all obstructions. In some embodiments, the transitional chamber may be frustoconical, but transition patterns other than conical can also be utilized. As shown in FIG. 1, transitional chamber 22 has a diameter 28 at the end toward the inlet chamber 16 that is larger than its diameter 30 at the end toward the outlet chamber 18. The relative dimensions of the transitional chamber can vary depending on factors such as the fluid properties (e.g., density) and anticipated pressure and velocity, as well as on the surrounding environment.

The total pressure sensing ports 24 in the exemplary embodiment are depicted as being located on the tubular member at the mid-point of the inlet chamber 16 along the longitudinal axis, and such an embodiment is within those contemplated by this disclosure. However, this embodiment is merely an example, and the total pressure sensing ports can be located at various locations along the longitudinal axis of the inlet chamber. The placement of the total pressure ports can be selected based on other design parameters such that the measured total pressure will be close to the freestream total pressure. In practical applications, there is a wide range of total pressure sensing port locations which will yield an acceptable total pressure measurement, as the total pressure is relatively insensitive to port location since the entire chamber 16 is very close to total pressure. However, the ports should be located far enough aft of the inlet to measure a stable total pressure across all operating conditions In some aspects, the device for measuring total pressure also includes a static pressure sensor in communication with a static pressure source of the fluid. This allows for determination of dynamic pressure and fluid flow velocity. In some embodiments, the static pressure sensor can be remote from the tubular member (e.g., on a surface of an aircraft or a fluid conduit wall). In some embodiments, the static pressure sensor can be a port on an exterior surface of the housing of tubular member 10 (not shown) that is parallel to the longitudinal axis 19, as is typical for Pitot-static tubes known in the art. In some embodiments, including the exemplary embodiment depicted in FIG. 1, a static pressure port can be located in the outlet chamber 20, as depicted by static pressure sensing ports 34, which are connected by static pressure sensing conduit 36 to static pressure sensor(s). As with the forward placement of the total pressure sensing location, the aft placement of static pressure sensing location inside the tubular member is quite different from conventional Pitot-static tubes that measure static pressure outside the tube.

The static pressure sensing ports 34 in the exemplary embodiment are depicted as being located on the tubular member at the mid-point of the outlet chamber 20 along the longitudinal axis, and such an embodiment is within those contemplated by this disclosure. However, this embodiment is merely an example, and the total pressure sensing ports can be located at various locations along the longitudinal axis of the inlet chamber. The static pressure port location can be selected such that the measured static pressure is close to the freestream static pressure or some known offset. The static port location can vary dependent on the geometry of the device and the desired level of compensation from the freestream static pressure, and can be determined by the skilled person with reasonable effort using tools such as computational fluid dynamics modeling.

Figure 2:
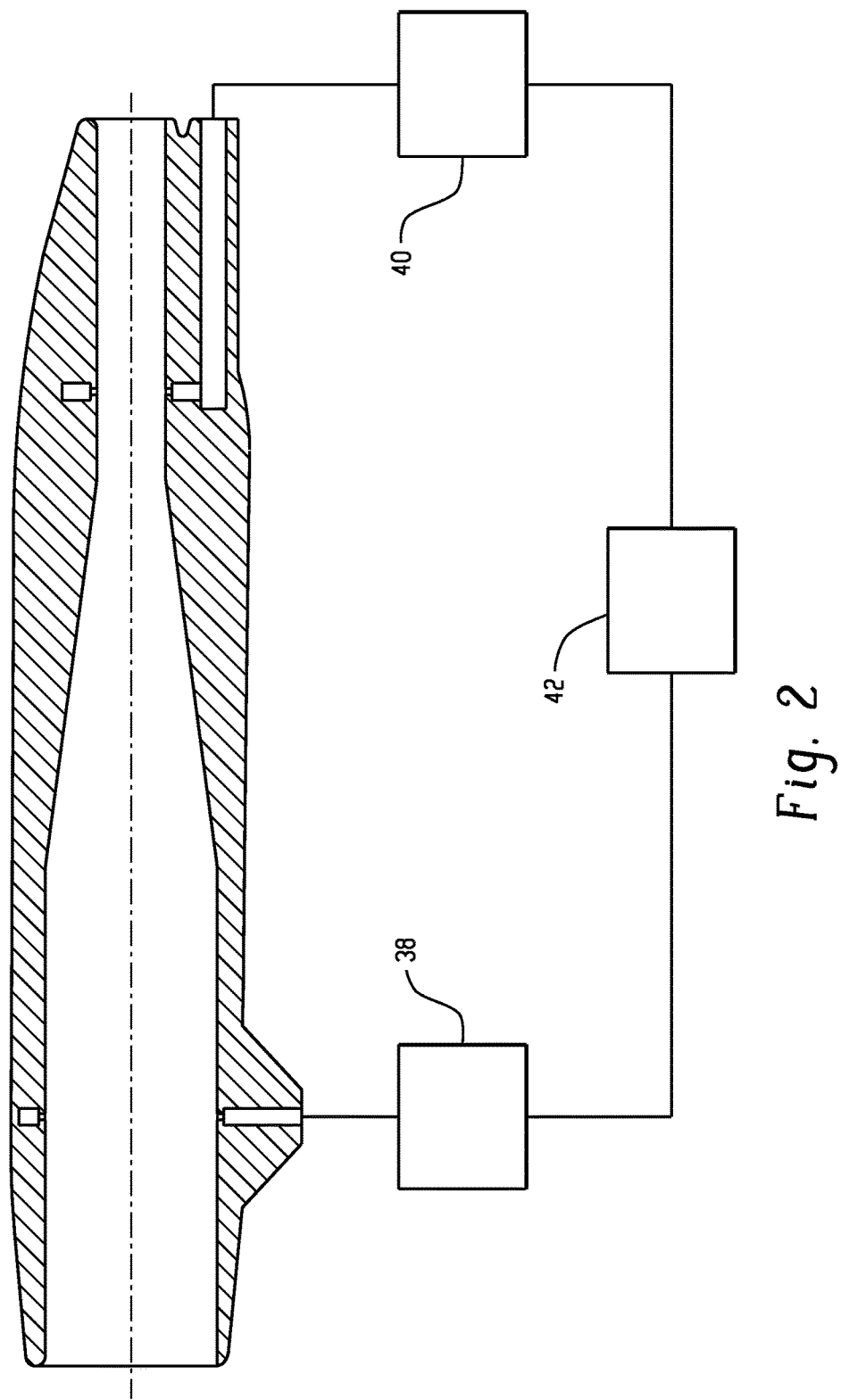
FIG. 2 is a schematic depiction of an aircraft airspeed measurement system.

The tubular member 10 can be incorporated into a fluid flow measuring device with electronic circuitry for determining pressures measured by the total pressure sensor and the static pressure sensor, and determining a dynamic fluid pressure, a fluid flow velocity, or if fluid density is known, a fluid flow rate based on the measured pressures. In some embodiments, the tubular member 10 can be used in an aircraft airspeed measuring device or system such as shown in FIG. 2, in which tubular member 10 and total pressure sensor 38 and static pressure sensor 40 provide total pressure and static pressure measurements through wired or wireless electronic communication to an electronic control unit 42 that includes circuitry for determining pressures measured by the total pressure sensor 38 and the static pressure sensor 40, and determining an airspeed based on the measured pressures.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A device for measuring total pressure of a fluid flow, comprising:
   a tubular member having a central longitudinal axis, comprising
      an inlet chamber having an inlet opening at a first end of the tubular member, the inlet opening having a first diameter transverse to the longitudinal axis,
      an outlet chamber having an outlet opening at a second end of the tubular member, the outlet opening having a second diameter transverse to the longitudinal axis, wherein the ratio of the first diameter to the second diameter is from 3:1 to 10:1, and
      a transitional chamber between the inlet chamber and the outlet chamber, the transitional chamber having a third diameter transverse to the longitudinal axis at an end toward the inlet chamber, and a fourth diameter, smaller than the third diameter, transverse to the longitudinal axis at an end toward the outlet chamber; and
   a total pressure sensor in communication with the inlet chamber.

2. The device of claim 1, further comprising a plurality of pressure sampling ports in the inlet chamber.

3. The device of claim 1, further comprising a static pressure sensor in communication with a static pressure source of the fluid.

4. The device of claim 3, wherein the static pressure sensor is in communication with the outlet chamber.

5. The device of claim 4, further comprising a plurality of pressure sampling ports in the outlet chamber.

6. The device of claim 1, wherein the tubular member includes an unobstructed path between the first and second opening.

7. The device of claim 6, wherein each of the inlet chamber, the transitional chamber, and the outlet chamber is free of obstructions.

8. A fluid flow measuring device comprising the device of claim 3 and electronic circuitry for determining pressures measured by the total pressure sensor and the static pressure sensor, and determining a dynamic fluid pressure, a fluid flow velocity, or a fluid flow rate based on the measured pressures.

9. The device of claim 1, further comprising an electrical heater.

10. The device of claim 1, wherein the ratio of the first diameter to the second diameter is from 4:1 to 8:1.

11. An aircraft airspeed measuring device comprising the device of claim 2 and electronic circuitry for determining pressures measured by the total pressure and static pressure sensors and determining an airspeed based on the measured pressures.

12. A method of measuring total pressure of a fluid flow, comprising
   measuring total pressure in an inlet chamber of a tubular member comprising:
      an inlet chamber having an inlet opening at a first end of the tubular member, the inlet opening having a first diameter transverse to the longitudinal axis,
      an outlet chamber having an outlet opening at a second end of the tubular member, the outlet opening having a second diameter transverse to the longitudinal axis, wherein the ratio of the first diameter to the second diameter is from 3:1 to 10:1, and
      a transitional chamber between the inlet chamber and the outlet chamber, the transitional chamber having a third diameter transverse to the longitudinal axis at an end toward the inlet chamber, and a fourth diameter, smaller than the third diameter, transverse to the longitudinal axis at an end toward the outlet chamber.

13. The method of claim 12, further comprising sampling air from a plurality of pressure-measuring ports in the inlet chamber, and pneumatically averaging the sampled inlet chamber pressures to determine total pressure.

14. The method of claim 12, further comprising taking pressure measurements at a plurality of pressure-measuring ports in the inlet chamber, and calculating total pressure based on the plurality of inlet chamber pressure measurements.

15. The method of claim 12, further comprising measuring a static pressure of the fluid and determining a dynamic pressure, a flow velocity, or a flow rate of the flowing fluid based on the measured total pressure and the measured static pressure of the fluid.

16. The method of claim 13, wherein the static pressure is measured in the outlet chamber.

17. The method of claim 16, further comprising sampling air from a plurality of pressure-measuring ports in the outlet chamber, and pneumatically averaging the sampled outlet chamber pressures to determine static pressure.

18. The method of claim 16, further comprising taking pressure measurements at a plurality of pressure-measuring ports in the outlet chamber, and calculating static pressure based on the plurality of inlet chamber pressure measurements.

19. The method of claim 16, wherein the tubular member is mounted on an aircraft, and the method further comprises determining an airspeed of the aircraft based on measured total air pressure and measured static air pressure.

20. The method of claim 12, wherein the fluid comprises entrained particles.

* * * * *